(12) United States Patent
Wartski et al.

(10) Patent No.: US 11,641,396 B1
(45) Date of Patent: *May 2, 2023

(54) VIRTUALIZED TRANSCODER

(71) Applicant: CSC Holdings, LLC, Bethpage, NY (US)

(72) Inventors: Yaron Wartski, New York, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,510

(22) Filed: Jan. 25, 2021

Related U.S. Application Data

(63) Continuation of application No. 15/395,877, filed on Dec. 30, 2016, now Pat. No. 10,904,329.

(51) Int. Cl.
*H04N 21/2343* (2011.01)
*H04L 15/16* (2006.01)
(Continued)

(52) U.S. Cl.
CPC ...... *H04L 67/1095* (2013.01); *H04L 12/4641* (2013.01); *H04L 65/612* (2022.05); *H04L 67/1097* (2013.01); *H04L 67/63* (2022.05)

(58) Field of Classification Search
CPC ............. H04L 67/1095; H04L 65/4084; H04L 67/327; H04L 67/1097; H04L 12/4641
(Continued)

(56) References Cited

U.S. PATENT DOCUMENTS 5,440,334 A 8/1995 Walters et al.
5,550,577 A 8/1996 Verbiest et al.
(Continued)

FOREIGN PATENT DOCUMENTS

AU 2008275579 A1 * 2/2010
CN 105871872 A * 8/2016
(Continued)

OTHER PUBLICATIONS

Atlas Venture Boston, "Adelphia Extends Partnership with Gotuit Media to Enhance On Demand Programming with Personalized Viewing," printed from http://www.atlasventure.com/newsandevents/news.cfm?id=308&p=1, Feb. 7, 2007 (2 pages).
(Continued)

*Primary Examiner* — David R Lazaro
*Assistant Examiner* — Berhanu Shitayewoldetadik
(74) *Attorney, Agent, or Firm* — Sterne, Kessler, Goldstein & Fox P.L.L.C

(57) ABSTRACT

Systems and methods to remotely store and provide telecast programs are provided. The method includes storing an exclusive first transcoded copy of a program in a first configuration for a first user along with multiple shared transcoded copies in respective multiple configurations. The method includes receiving a request from the first user to view the program, streaming the first transcoded copy, determining based on one or more criteria whether the first transcoded copy is supported, and continuing to stream the first transcoded copy or switching to a second transcoded copy from the multiple transcoded copies based on the criteria.

20 Claims, 4 Drawing Sheets

(51) Int. Cl.
  *H04N 21/231* (2011.01)
  *H04L 29/06* (2006.01)
  *H04L 29/12* (2006.01)
  *G06F 15/16* (2006.01)
  *H04L 29/08* (2006.01)
  *H04L 67/1095* (2022.01)
  *H04L 67/1097* (2022.01)
  *H04L 12/46* (2006.01)
  *H04L 65/612* (2022.01)
  *H04L 67/63* (2022.01)

(58) Field of Classification Search
  USPC ........................................... 709/219
  See application file for complete search history.

(56) References Cited

U.S. PATENT DOCUMENTS

| | | |
|---|---|---|
| 5,568,181 A | 10/1996 | Greenwood et al. |
| 5,720,037 A | 2/1998 | Biliris et al. |
| 5,721,829 A | 2/1998 | Dunn et al. |
| 6,002,720 A | 12/1999 | Yurt et al. |
| 6,151,444 A * | 11/2000 | Abecassis ............ G11B 27/105 348/E7.071 |
| 6,182,128 B1 | 1/2001 | Kelkar et al. |
| 6,233,389 B1 | 5/2001 | Barton et al. |
| 6,801,947 B1 | 10/2004 | Li |
| 6,963,590 B1 | 11/2005 | Mann et al. |
| 6,985,932 B1 | 1/2006 | Glaser et al. |
| 7,000,242 B1 | 2/2006 | Haber |
| 7,080,400 B1 | 7/2006 | Navar |
| 7,325,245 B1 | 1/2008 | Clapper |
| 7,469,284 B1 * | 12/2008 | Dubrovsky ............ H04L 41/22 709/224 |
| 7,624,412 B2 | 11/2009 | McEvilly et al. |
| 7,802,275 B1 * | 9/2010 | Fernandez ............ H04N 7/15 725/135 |
| 8,132,221 B2 | 3/2012 | Malik |
| 8,732,776 B2 | 5/2014 | Youssefmir |
| 8,782,285 B1 * | 7/2014 | Cassidy ............ H04N 21/6125 709/246 |
| 8,997,136 B2 | 3/2015 | Brooks et al. |
| 9,077,667 B2 * | 7/2015 | Sridhar ............ H04L 65/65 |
| 9,369,723 B2 * | 6/2016 | Syed ............ H04N 19/159 |
| 9,473,548 B1 * | 10/2016 | Chakrovorthy ...... H04L 65/613 |
| 9,571,782 B2 | 2/2017 | Rutledge |
| 9,819,984 B1 | 11/2017 | Neill et al. |
| 9,955,203 B2 | 4/2018 | Phillips et al. |
| 10,158,913 B1 | 12/2018 | Rutledge |
| 10,178,425 B1 | 1/2019 | Neill |
| 10,638,184 B2 | 4/2020 | Phillips et al. |
| 10,904,329 B1 | 1/2021 | Wartski et al. |
| 10,986,390 B2 | 4/2021 | Phillips et al. |
| 11,064,239 B1 | 7/2021 | Neill et al. |
| 11,122,330 B1 | 9/2021 | Rutledge |
| 11,284,165 B1 | 3/2022 | Kenny et al. |
| 2001/0043616 A1 | 11/2001 | Hild |
| 2002/0026645 A1 * | 2/2002 | Son ............ H04N 21/4753 725/111 |
| 2002/0069405 A1 | 6/2002 | Chapin et al. |
| 2002/0076195 A1 | 6/2002 | Nakajima et al. |
| 2002/0094025 A1 | 7/2002 | Hanamura |
| 2002/0138844 A1 | 9/2002 | Otenasek et al. |
| 2002/0174147 A1 * | 11/2002 | Wang ............ G06F 16/957 707/E17.119 |
| 2003/0044170 A1 | 3/2003 | Haddad et al. |
| 2003/0070182 A1 | 4/2003 | Pierre et al. |
| 2003/0097659 A1 | 5/2003 | Goldman |
| 2003/0113027 A1 * | 6/2003 | Chan ............ H04N 19/70 375/E7.074 |
| 2003/0149988 A1 | 8/2003 | Ellis et al. |
| 2003/0169813 A1 * | 9/2003 | Van Der Schaar ........... H04N 21/23424 375/E7.198 |
| 2003/0177247 A1 * | 9/2003 | Dunning ............ H04L 65/80 709/228 |
| 2003/0208765 A1 | 11/2003 | Urdang et al. |
| 2003/0208767 A1 | 11/2003 | Williamson et al. |
| 2003/0233663 A1 | 12/2003 | Rao |
| 2004/0006698 A1 | 1/2004 | Apfelbaum |
| 2004/0057449 A1 * | 3/2004 | Black ............ H04L 65/1104 370/432 |
| 2004/0098463 A1 * | 5/2004 | Shen ............ H04N 21/2343 709/213 |
| 2004/0133923 A1 | 7/2004 | Watson et al. |
| 2004/0187164 A1 | 9/2004 | Kandasamy et al. |
| 2004/0193648 A1 * | 9/2004 | Lai ............ H04N 21/234309 348/E7.071 |
| 2004/0194146 A1 | 9/2004 | Bates et al. |
| 2004/0203353 A1 | 10/2004 | Connor |
| 2004/0226034 A1 | 11/2004 | Kaczowka et al. |
| 2004/0250282 A1 | 12/2004 | Bankers et al. |
| 2004/0255336 A1 | 12/2004 | Logan et al. |
| 2004/0268386 A1 | 12/2004 | Logan et al. |
| 2005/0033850 A1 | 2/2005 | Kirkland |
| 2005/0034171 A1 | 2/2005 | Benya |
| 2005/0251827 A1 | 11/2005 | Ellis et al. |
| 2005/0267813 A1 | 12/2005 | Monday |
| 2006/0015580 A1 * | 1/2006 | Gabriel ............ G06F 21/10 709/219 |
| 2006/0020993 A1 | 1/2006 | Hannum et al. |
| 2006/0080703 A1 | 4/2006 | Compton |
| 2006/0130116 A1 | 6/2006 | Shi et al. |
| 2006/0140584 A1 | 6/2006 | Ellis et al. |
| 2006/0218604 A1 | 9/2006 | Riedl et al. |
| 2006/0265384 A1 | 11/2006 | Lee |
| 2007/0044132 A1 | 2/2007 | Kubo |
| 2007/0094702 A1 | 4/2007 | Khare et al. |
| 2007/0124250 A1 * | 5/2007 | Yamashima ............ G06F 21/10 348/E7.056 |
| 2007/0130601 A1 * | 6/2007 | Li ............ H04L 65/611 725/112 |
| 2007/0154190 A1 | 7/2007 | Gilley |
| 2007/0162941 A1 * | 7/2007 | Bennett ............ H04N 21/6125 725/112 |
| 2007/0180135 A1 * | 8/2007 | Kenrick ............ H04N 21/2343 348/E7.071 |
| 2007/0226169 A1 | 9/2007 | Solyanik |
| 2007/0239787 A1 * | 10/2007 | Cunningham ...... G06F 3/04817 |
| 2007/0245384 A1 | 10/2007 | Walter et al. |
| 2007/0263514 A1 * | 11/2007 | Iwata ............ H04N 5/91 369/84 |
| 2007/0263980 A1 | 11/2007 | Chen et al. |
| 2007/0268164 A1 * | 11/2007 | Lai ............ H04N 21/2743 341/51 |
| 2007/0276925 A1 | 11/2007 | LaJoie et al. |
| 2007/0294170 A1 | 12/2007 | Vantalon et al. |
| 2008/0001791 A1 * | 1/2008 | Wanigasekara-Mohotti ............ H04L 67/1097 341/51 |
| 2008/0005770 A1 | 1/2008 | Acharya et al. |
| 2008/0027953 A1 * | 1/2008 | Morita ............ H04N 21/4363 |
| 2008/0031590 A1 * | 2/2008 | Kulas ............ H04N 9/8227 386/E9.04 |
| 2008/0046929 A1 * | 2/2008 | Cho ............ H04N 21/2665 348/E7.071 |
| 2008/0059645 A1 | 3/2008 | Gregotski et al. |
| 2008/0091535 A1 * | 4/2008 | Heiser, II ............ G06Q 30/0257 705/14.69 |
| 2008/0134239 A1 | 6/2008 | Knowles et al. |
| 2008/0134278 A1 | 6/2008 | Al-Karmi |
| 2008/0140818 A1 | 6/2008 | Du Breuil et al. |
| 2008/0209066 A1 * | 8/2008 | Spio ............ H04L 65/80 709/231 |
| 2008/0216119 A1 * | 9/2008 | Pfeffer ............ H04N 5/76 725/40 |
| 2008/0216135 A1 * | 9/2008 | Pfeffer ............ H04N 21/2383 725/93 |
| 2008/0216136 A1 * | 9/2008 | Pfeffer ............ H04N 5/775 725/100 |

(56) References Cited

U.S. PATENT DOCUMENTS

| | | | |
|---|---|---|---|
| 2009/0006643 A1* | 1/2009 | Lee | H04N 21/234309 709/231 |
| 2009/0019492 A1* | 1/2009 | Grasset | H04N 21/4325 348/E7.071 |
| 2009/0028182 A1* | 1/2009 | Brooks | H04L 41/0896 370/466 |
| 2009/0029681 A1 | 1/2009 | Clemow et al. | |
| 2009/0119322 A1* | 5/2009 | Mills | G06F 16/40 |
| 2009/0138507 A1 | 5/2009 | Burckart et al. | |
| 2009/0154556 A1* | 6/2009 | Kim | H04L 65/1083 375/E7.126 |
| 2010/0034257 A1* | 2/2010 | Sedeffow | H04N 19/436 375/E7.198 |
| 2010/0036963 A1 | 2/2010 | Gahm et al. | |
| 2010/0115567 A1 | 5/2010 | Gupta et al. | |
| 2010/0115568 A1 | 5/2010 | Gupta et al. | |
| 2010/0115575 A1* | 5/2010 | Yu | H04N 7/17318 725/142 |
| 2010/0174804 A1* | 7/2010 | Sonoyama | H04L 67/1095 709/224 |
| 2011/0022801 A1* | 1/2011 | Flynn | G06F 11/108 711/120 |
| 2011/0035600 A1* | 2/2011 | Busser | G06F 21/62 713/189 |
| 2011/0106910 A1* | 5/2011 | Grasset | G06F 11/1451 709/217 |
| 2011/0209185 A1* | 8/2011 | Cho | H04N 7/17318 725/93 |
| 2011/0255555 A1* | 10/2011 | Alexander | H04N 21/239 370/468 |
| 2011/0320559 A1* | 12/2011 | Foti | H04L 65/765 709/217 |
| 2012/0023251 A1* | 1/2012 | Pyle | H04L 65/65 709/231 |
| 2012/0036048 A1* | 2/2012 | Robb | G06F 3/04842 707/769 |
| 2012/0054664 A1* | 3/2012 | Dougall | H04N 21/6582 715/772 |
| 2012/0084811 A1 | 4/2012 | Thompson et al. | |
| 2012/0084812 A1* | 4/2012 | Thompson | H04N 21/44204 725/34 |
| 2012/0144408 A1 | 6/2012 | Kim et al. | |
| 2012/0144424 A1* | 6/2012 | Ganesan | H04N 21/42204 725/40 |
| 2012/0185530 A1* | 7/2012 | Reza | H04N 21/47214 709/203 |
| 2012/0210382 A1* | 8/2012 | Walker | G06F 16/70 725/115 |
| 2012/0254536 A1* | 10/2012 | Wilke | H04N 21/4435 711/E12.001 |
| 2012/0266198 A1* | 10/2012 | Kanojia | H04N 21/231 725/62 |
| 2013/0044260 A1 | 2/2013 | Vestergaard | |
| 2013/0151493 A1* | 6/2013 | Roth | H04L 65/762 707/703 |
| 2013/0262559 A1* | 10/2013 | Neerings | G06Q 30/02 709/203 |
| 2014/0025837 A1* | 1/2014 | Swenson | H04N 21/2396 709/231 |
| 2014/0040956 A1* | 2/2014 | Cho | H04N 21/462 725/44 |
| 2014/0059134 A1* | 2/2014 | Chiu | H04L 65/612 709/204 |
| 2014/0068789 A1* | 3/2014 | Watts | H04L 65/613 709/219 |
| 2014/0082124 A1* | 3/2014 | van Coppenolle | H04L 67/563 709/213 |
| 2014/0108585 A1* | 4/2014 | Barton | H04N 21/25891 709/213 |
| 2014/0115090 A1* | 4/2014 | Hasek | H04N 21/21815 709/213 |
| 2014/0181864 A1* | 6/2014 | Marshall | H04N 21/234309 725/38 |
| 2014/0269401 A1* | 9/2014 | Gondi | H04L 65/70 370/253 |
| 2014/0269920 A1* | 9/2014 | Rodriguez | H04N 19/186 375/240.12 |
| 2014/0282787 A1* | 9/2014 | Wirick | H04N 21/231 725/115 |
| 2014/0328569 A1* | 11/2014 | Strobl | G11B 27/034 386/230 |
| 2014/0337901 A1* | 11/2014 | Phillips | H04N 21/4334 725/88 |
| 2014/0337903 A1 | 11/2014 | Zhu | |
| 2014/0337909 A1* | 11/2014 | Phillips | H04N 21/812 725/115 |
| 2014/0359140 A1* | 12/2014 | Shankarraman | H04L 65/75 709/227 |
| 2014/0359166 A1* | 12/2014 | Mamidwar | H04L 65/765 709/246 |
| 2015/0007237 A1* | 1/2015 | Good | H04N 21/234309 725/92 |
| 2015/0046526 A1* | 2/2015 | Bush | H02J 13/00028 709/204 |
| 2015/0113058 A1* | 4/2015 | Zhang | H04L 65/612 709/204 |
| 2015/0135214 A1 | 5/2015 | Reisman | |
| 2015/0189018 A1* | 7/2015 | Cassidy | H04L 65/762 709/219 |
| 2015/0227294 A1* | 8/2015 | Talvensaari | G11B 27/031 715/717 |
| 2015/0242500 A1* | 8/2015 | Walker | H04N 21/274 725/92 |
| 2015/0243078 A1* | 8/2015 | Watson | G06F 3/1454 345/547 |
| 2015/0244973 A1* | 8/2015 | Mullen | G11B 20/00971 386/252 |
| 2015/0249859 A1* | 9/2015 | Hartley | H04L 67/34 375/240.02 |
| 2015/0269950 A1* | 9/2015 | Schug | G10L 19/032 704/501 |
| 2015/0281710 A1* | 10/2015 | Sievert | H04L 65/762 375/240.02 |
| 2015/0324379 A1* | 11/2015 | Danovitz | H04N 21/2743 707/825 |
| 2015/0339303 A1* | 11/2015 | Perlegos | G06F 16/7867 707/756 |
| 2015/0341687 A1* | 11/2015 | Luthra | H04N 21/4147 725/80 |
| 2015/0350726 A1* | 12/2015 | Tan | H04N 19/136 348/441 |
| 2015/0363422 A1* | 12/2015 | Shibayama | H04L 67/1097 707/827 |
| 2016/0014411 A1* | 1/2016 | Sychev | H04N 19/82 375/240.12 |
| 2016/0088084 A1* | 3/2016 | Suman | G06F 3/06 709/201 |
| 2016/0164938 A1* | 6/2016 | Yu | H04L 65/80 709/231 |
| 2016/0179826 A1* | 6/2016 | Batra | H04L 67/1097 707/756 |
| 2016/0191961 A1* | 6/2016 | Fisher | H04N 21/234309 725/116 |
| 2016/0210165 A1* | 7/2016 | Ma | G06F 9/45558 |
| 2016/0224310 A1* | 8/2016 | Wallner | G06F 3/165 |
| 2016/0239437 A1* | 8/2016 | Le | H04L 67/10 |
| 2016/0261912 A1* | 9/2016 | Gratton | H04N 21/440218 |
| 2016/0309211 A1* | 10/2016 | Grasset | G06F 11/2056 |
| 2016/0316234 A1* | 10/2016 | Casey | H04N 21/437 |
| 2016/0323348 A1* | 11/2016 | Bradbury | H04L 67/02 |
| 2016/0323351 A1* | 11/2016 | Luthra | G06F 16/172 |
| 2016/0337477 A1* | 11/2016 | Bush | H04N 21/4436 |
| 2016/0344789 A1* | 11/2016 | Watts | H04N 21/2541 |
| 2016/0360243 A1* | 12/2016 | Arbuckle | H04N 21/2181 |
| 2016/0371286 A1* | 12/2016 | Danovitz | H04N 21/4788 |
| 2017/0006314 A1* | 1/2017 | Danovitz | G06F 16/152 |
| 2017/0034112 A1* | 2/2017 | Perlegos | H04W 4/21 |

(56) References Cited

U.S. PATENT DOCUMENTS

| | | | | |
|---|---|---|---|---|
| 2017/0064311 | A1* | 3/2017 | Ma | H04L 65/60 |
| 2017/0064344 | A1* | 3/2017 | Petersen | H04N 21/44004 |
| 2017/0111670 | A1* | 4/2017 | Ducloux | H04N 21/231 |
| 2017/0264968 | A1* | 9/2017 | Mao | H04L 67/568 |
| 2017/0339206 | A1* | 11/2017 | Holden | H04L 65/764 |
| 2017/0344335 | A1* | 11/2017 | Lection | G05B 15/02 |
| 2017/0353768 | A1* | 12/2017 | Muvavarirwa | H04N 21/85403 |
| 2018/0124445 | A1* | 5/2018 | Beili | H04N 21/84 |
| 2018/0167626 | A1* | 6/2018 | Andersson | H04N 19/132 |

FOREIGN PATENT DOCUMENTS

| | | | | |
|---|---|---|---|---|
| EP | 0 757 487 B1 | | 6/2000 | |
| EP | 2151970 A1 | * | 2/2010 | H04L 65/4084 |
| EP | 2977915 A1 | * | 1/2016 | G06F 16/78 |
| FR | 3036210 A1 | * | 11/2016 | G01V 99/005 |

OTHER PUBLICATIONS

Czyrnek, M et al., "Large-scale multimedia content delivery over optical networks for interactive TV services," *Future Generation Computer Systems*, vol. 22, Elsevier B.V., 2006 (pp. 1018-1024).

Fujii, R., "AT&T Moving into Cable Territory With Homezone Service," printed from http://www.backchannelmedia.com/newsletter/articles/4881/ATampT-Moving-into-Cable-T . . . ,. Nov. 10, 2006 (3 pages).

Incentra Solutions, Inc., "Front Porch Digital Signs Global Reseller Agreement with Volicon," printed from http://www.incentrasolutions.com/print.php./sid/37/aid/159/pid/211nid/447/siteype/Incentra . . . , Sep. 27, 2005 (3 pages).

Mercer, C., "Keeping up with content: *How to successfully manage VOD's bread-and-butter*," CED—www.cedmagazine.com, Dec. 2004 (pp. 51-54).

Mostefaoui, A., "A modular and adaptive framework for large scale video indexing and content-based retrieval: the SIRALE system," *Software—Practice and Experience*, vol. 36, John Wiley & Sons, Ltd., 2006 (pp. 871-890).

"Vividon and EMC Agree to Integrate 'Best in Class' On-demand Streaming and Centera Content Addressed Storage," *PRNewswire*, (Sep. 16, 2002): NEM01616092002, *InfoTrac OneFile*, Thomson Gale. Social Law Library, Feb. 7, 2007 (2 pages).

Wang, B. et al., "Optimal Proxy Cache Allocation for Efficient Streaming Media Distribution," *IEEE INFOCOM*, 2002 (pp. 1726-1735).

Yeldell, C., "Scripps, Amazon.Com Make Unbox Agreement; Deal Will Allow Shoppers to Access Network's Programs With Digital Video Download," printed from http://www.redorbit.com/modules/news/tools.php?tool=print&id=776909, dated Feb. 7, 2007 (2 pages).

U.S. Appl. No. 12/055,795, filed Mar. 26, 2008, entitled "Digital Video Recording With Remote Storage".

* cited by examiner

VIRTUALIZED TRANSCODER

CROSS-REFERENCE TO RELATED APPLICATIONS

This application is a continuation of U.S. patent application Ser. No. 15/395,877, filed Dec. 30, 2016, now U.S. Pat. No. 10,904,329, which is incorporated herein by reference in its entirety.

BACKGROUND

Field of the Disclosure

The embodiments presented herein are generally directed towards providing remotely stored copies of telecast programs over a network and more specifically towards a virtualized transcoder.

Background Art

Remote storage of a telecast program allows a user to store and view the telecast program on-demand. However, different devices used to view the stored program or changes in available bandwidth require the telecast program to be transcoded in numerous formats and resolutions in a cost-effective manner while abiding by current copyright laws. Methods and systems are needed to solve the above problems.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates an example content distribution system according to an embodiment of the disclosure.

FIG. 2 further illustrates a content storage and distribution system according to an embodiment of the disclosure.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor" or "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor. The systems and devices described herein may each include processor or processor circuitry to implement the embodiments presented herein.

Systems and devices described herein may each include an upstream physical layer (PHY) to transmit upstream communications and a downstream PHY to receive downstream communications.

Figure 1:
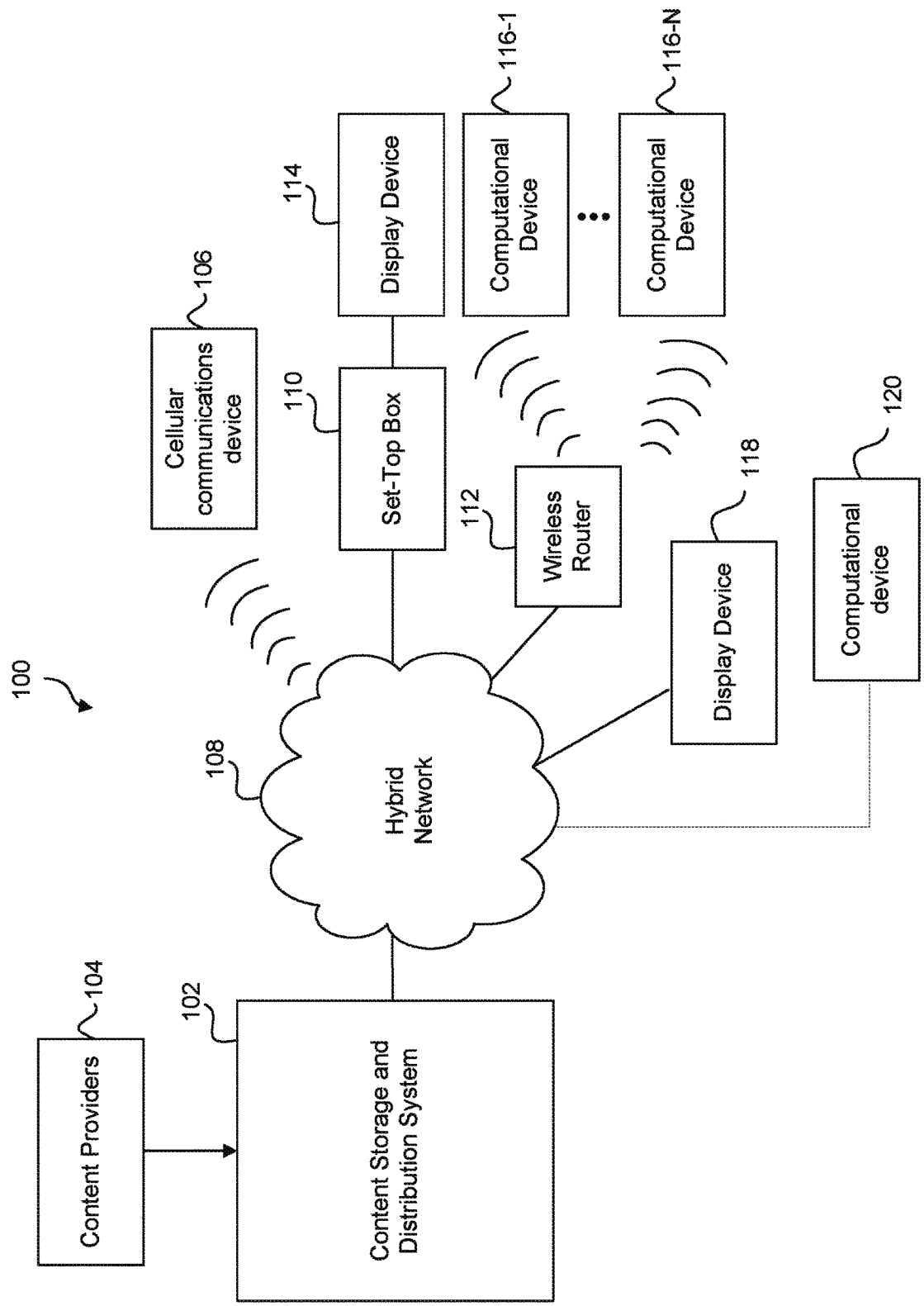

FIG. 1 illustrates an example content distribution system according to an embodiment of the disclosure.

System 100 includes one or more content providers 104 coupled to a content storage and distribution system 102. Hybrid network 108 is coupled to content storage and distribution system 102, cellular communications device 106, set top box 110, and wireless router 112. Set top box 110 is coupled to display device 114. Wireless router 112 is coupled to computational devices 116-1 to 116-N. Display device 118 and computational device 120 are each directly coupled to hybrid network 108.

Hybrid network 108 as described herein may include networks that implement one or more communication protocols. Hybrid network 108 described herein may utilize wired or wireless communication protocols, including for example, the Transmission Control Protocol (TCP), Internet protocol (IP), Data Over Cable Service Interface Specification (DOCSIS), Digital Subscriber Line (DSL), G.fast DSL, Passive Optical Network (PON), Synchronous Optical Networking (SONET), Synchronous Digital Hierarchy (SDH), Wireless Local Area Networks (WLANs) as standardized by the Institute of Electrical and Electronics Engineers (IEEE) in the IEEE 802.11 specification, and Ethernet as standardized by the IEEE in the IEEE 802.3 specification, which are incorporated herein by reference in their entirety. The Internet as referred to herein refers to a network that uses TCP/IP. Exemplary embodiments are not limited to wireless communication networks conforming to the 802.11 specification, and can be used or implemented in one or more other kinds of wireless communication access networks, including (but not limited to), Bluetooth (IEEE 802.15.1 and Bluetooth Special Interest Group), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

Further, exemplary embodiments are not limited to the above wireless communication networks and can be used or implemented in one or more wireless communication networks conforming to one or more 3rd Generation Partnership Project (3GPP) wireless communication protocols and/or to one or more non-3GPP wireless communication protocols. For example, the exemplary embodiments can be configured to utilize one or more cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples.

In an embodiment, cellular communication device 106 may be a cellular phone, tablet, or any computational device that can communicate using cellular transmission protocols. The cellular device may also be enabled to communicate using a wireless network such as the WLAN in addition to using cellular transmission protocols. Computational devices 116-1-N may be any type of computational device that can wirelessly communicate with wireless router 112. For example, computational devices 116-1-N may be wireless enabled cellular phones, laptops, or tablets. Computational device 118 may be any type of computational device that can directly couple to hybrid network 108. For example, computational device 118 may the a computer or laptop coupled to hybrid network via an Ethernet connection. Display device 114 may be a television. Display device 118 may be any sort of display device that can directly couple to hybrid network 108. For example, display device 118 may be a television which can connect to hybrid network 108 via an Ethernet connection. Content storage and distribution system 102 may be referred to as a Multi-System Operator (MSO). Content storage and distribution system 102 may include a headend of a Cable Modem Termination System (CMTS).

Content storage and distribution system 102 receives content from content providers 104. The content provided by content providers 104 may be media such as television programming or audio programming. Content storage and distribution system 102 distributes the received content through hybrid network to cellular communications devices 106, set-top box 110, and wireless router 112. Set-top box 110 provides the content to display device 114 for display to a user. Wireless router 112 wirelessly provides the content to computational devices 116-1-N. Hybrid network 108 wirelessly provides the content to cellular communications device 106 through a cellular communications protocol.

Cellular communications device 106, display device 114, and computational devices 116-1-N may be able to receive and display content using specific video codecs and/or resolutions. For example, display device may be a high-definition television that can display video encoded at for example, at a highest resolution of 4K in an HEVC (also known as H.265) or VP9 codec in addition to other video formats such as 1080p MPEG. Cellular communications device 106 may be able to display video in encoded in, for example, a H.264 or Quicktime codec and resolutions ranging from 480p to 720p. Computations devices 116 may be for example a tablet or a laptop that can display video using a range of codecs such as MPEG2, MPEG4, DivX, H.264 and resolutions such as 480i, 480p, 720p, 1080p, 4k and beyond. A codec or video codec might be referred to as a "format" herein. A resolution at which a video is stored may be referred to as a "profile" herein. The combination of video codec and resolution at which a particular program is encoded is referred to as a "configuration" herein. It is to be appreciated that the type of codec or resolution is device dependent, a design choice, and may be arbitrary. For example, the codec might be x265, h.265, HEVC, 10 bit x264, x264, h.264, AVCHD, AVC, DivX, XviD, MP4, MPEG4, MPEG2 or any other type of codec. The resolution may be 480i, 480p, 576i, 576p, High Definition (HD), 720i, 720p, 1080i, 1080p, 4k or any other type of resolution. The configuration may be any combination of codec and resolution. A cellular communications device 106, a display device 114, display device 118, a computational device 116-1-N or computational device 120 used by a user to request a telecast program to be recorded and played back may be referred to as a "device" or a "user-device" herein for brevity.

A resolution at which a device can display video may also be dependent on a bandwidth available to the device. Some devices support Adaptive Bit Rate (ABR) where based on available bandwidth, content storage and distribution system 102 changes resolution and/or codec and the device can adapt to the change in the resolution and/or codec. For example, a computational device 116 might initially have a bandwidth connection to content storage and distribution system 102 that allows it to receive and display video encoded at 1080p in an MPEG2 codec. Due to network congestion, a bandwidth of a connection between content storage and distribution system 102 and the computational device 116 might later decrease to where 720p MPEG2 video encoded might be the highest resolution at which a computational device 116 can display video without lagging or buffering. As a result, content storage and distribution system 102 might have to switch a video stream from 1080p MPEG2 to 720p MPEG2. The switch requires content storage and distribution system 102 to transcode and store a program in both the 1080p and 720p MPEG2 formats. In another example, a user might begin viewing a program that has been transcoded into a 4K HEVC format on a television and then later switch to viewing a remainder of the program on a tablet that can only support 1080p MPEG2 video. Thus, numerous possible combinations of codecs and resolutions might be required because different types of devices might support only certain codecs and resolutions or because changes in available bandwidth require different codecs or resolutions. As a result content storage and distribution system 102 may have to store a particular program in numerous possible configurations of codecs and resolutions.

Remote Server Digital Video Recording (RS-DVR) technology allows a user to store a program in a memory at content storage and distribution system 102 thereby obviating the need to locally store the program in a local Digital Video Recorder (DVR). However, current copyright laws require that a copy of the program stored in content storage and distribution system be exclusive to the user and/or stored in an area of memory that is exclusive to a user. This might require content storage and distribution system 102 to store a program for each user in multiple configurations resulting in an exponential increase in the requirement for additional storage servers, rack space, power, cooling, and maintenance. This increases both capital expenditure and operating expenditure.

In an example, content and storage distribution system 102 might store a single copy of a program in a first configuration and transcode the stored copy of the program in real-time or on-the-fly into a different configuration when a bandwidth or device changes. However, real-time transcoding is cost-prohibitive with current costs being up to $1000 per transcoding operation due to hardware, software, and licensing costs. Embodiments presented herein provide methods and systems to overcome the problems described herein while adhering to current copyright laws.

Embodiments presented herein, in response to a request for storage of a program for later viewing by a first user, cause content storage and distribution system 102 to store a first exclusive transcoded copy of a program in a first configuration. The first configuration includes a first resolution and a first codec. In an example, the first resolution is the highest available resolution. The first exclusive copy is stored in a first storage area that is exclusive to the first user. Storage of the first exclusive copy in a manner that abides by copyright law is provided in U.S. patent application Ser. No. 14/550,566, filed Mar. 26, 2008, now U.S. Pat. No. 9,819,984, which is incorporated by reference herein in its entirety. When a second user requests to store the same program for later viewing, content storage and distribution system 102 stores a second exclusive transcoded copy of the program in the first configuration in a second storage area that is exclusive to the second user. The program is also transcoded into multiple different configurations and stored in a shared storage area.

When the first user requests to view the stored program, to abide by copyright laws, content storage and distribution system 102 starts by streaming the first exclusive transcoded copy of the program. Content storage and distribution system 102 determines whether a device or bandwidth available to the first user can support the first configuration. If the first configuration can be supported, then content storage and distribution system 102 continue to stream the first exclusive transcoded copy in the first configuration to the first user. If the first configuration cannot be supported, for example due to available bandwidth or a user-device's capabilities to display media, then a transcoded copy of the program from the multiple transcoded copies stored in the shared content storage server is selected based on either the type of device or the bandwidth available to the first user. Content storage and distribution system 102 may continue to switch transcoded copies in which the program is transmitted based on changes in either bandwidth or type of device.

While content storage and distribution system 102 may switch transcoded copies based on changes in criteria such as type of device or bandwidth, it is to be appreciated by persons of skill in the art that other factors based on design implementation may be used to switch transcoded copies as well. One factor may be user preferences. For example, a user may select a resolution and/or codec at which the user wishes to view the stored program. In response to the user preferences content storage and distribution system 102 may switch transcoded copies. For example, in order to conserve bandwidth, reduce video buffering times, or conserve data in a data plan of a cellular service provider, a user may select to view a video in a particular resolution and/or codec.

Another factor may be a network generated limitation. For example, hybrid network may 108 may monitor internal network congestion and send a signal via input signal 215 to content storage and distribution system 102 to switch the transcoded copies. Alternatively, hybrid network 108 may have certain bandwidth limitations that it signals via input signals 215 causing content storage and distribution network 102 to switch transcoded copies.

A further factor may be different tiers of subscription. For example, a user may subscribe to a particular level of service from content storage and distribution system 102. The level of service subscribed to may be used by content storage and distribution system 102 to determine which transcoded copy to switch to. For example, a user subscribed to a lower level of service may receive a transcoded copy that is at a lower resolution. In a further example, a user may be subscribed to receive a transcoded copy at a first resolution for a first user device and at a second resolution for a second user device. For example, a user may be subscribed to receive video at 4K resolution on their television and to receive video at 720p resolution on their mobile devices. Based on the different subscription levels content storage and distribution system 102 may accordingly switch transcoded copies as described herein.

When the second user requests to stream the program, the second exclusive transcoded copy is streamed the second user, instead of the first copy that is exclusive to the first user, in order to comply with copyright laws. Content storage and distribution system 102 may switch to a different transcoded copy of the program stored when there is a change in criteria such as type of device or bandwidth available to the second user.

Figure 2:
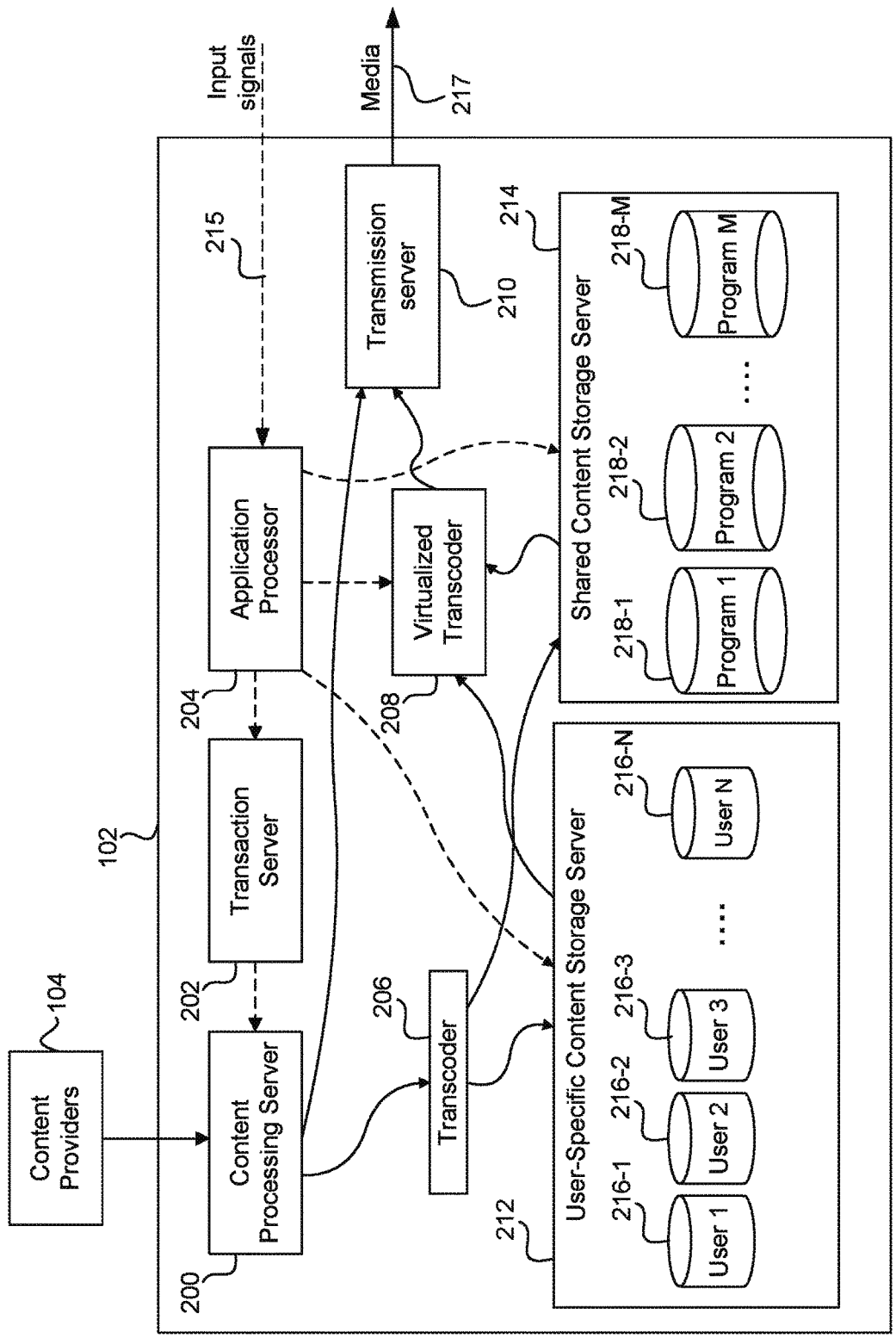

FIG. 2 further illustrates content storage and distribution system 102 according to an embodiment of the disclosure.

Content storage and distribution system 102 includes an application processor coupled to a transaction server 202, a user-specific content storage server 212, a shared content storage server 214, and to a virtualized transcoder 208. Transaction server 202 is coupled to content processing server 200. Content processing server 200 is coupled to transcoder 206 and transmission server 210. Transcoder 206 is coupled to user-specific content storage server 212 and to shared content storage server 214. User-specific content storage server 212 and shared content storage server 214 are coupled to virtualized transcoder 208. Virtualized transcoder 208 is coupled to transmission server 210. FIG. 2 illustrates control information such as commands using dotted lines and illustrates media flow using solid lines.

According to an embodiment of the disclosure, user-specific content storage server 212 includes storage areas 216-1-N that are exclusively associated with users. For example, storage area 216-1 is exclusively available for storage and retrieval to a first user, and storage area 216-2 is exclusively available for storage and retrieval to a second user. As will be explained further below, users that have stored a particular program in their respective exclusive storage areas 216-1-N share transcoded copies of that particular program that are stored in shared storage areas 218-1-M.

Content providers 104 provide media such as television programming to content processing server 200. Content processing server 200 transmits the media to a transmission server 210 which relays it to hybrid network 108 for distribution to devices.

Embodiments presented herein allow a device to send a command via input signals 215 to content storage and distribution system 102 to record a television program for later viewing. Application processor 204 manages a user's recording and playback commands. Application processor 204 verifies that a device sending a user's commands is authorized to receive the television programming requested. When a command is received to record a television program, application processor 204 determines whether space is available on a storage area 216-1 associated with the user. If the user does not have a storage area 216 allocated to them, the request is denied. Alternatively, if a user does have a storage area 216 assigned to them but there is not enough space for storing the program, then the request may be denied and an error message might be displayed instructing the user to either purchase more space or to free up space by deleting content from their assigned storage area 216. In some instances, the application processor 204 recognizes video-on-demand (VOD) programming and will not process a user command to record VOD programming.

Transaction server 202 aggregates all the recording commands for a particular program received from one or multiple users and, at the time when a program's telecast, the transaction server 202 sends a message to the content processing server 104 indicating which and how many users have requested the program be recorded.

Content processing server 200 responds to messages received from the transaction server 202 and creates a duplicate content stream for each user having commanded the recording of the same program. Content processing server 200 determines a respectively assigned storage area 216 to store the program for each user who has requested the program to be recorded. The user-specific content storage server 212 then copies the program onto the dedicated storage areas 216 of each user who commanded a particular program be recorded.

In an example, a first user may send a command to store a particular program in their assigned storage area 216-1. Upon receiving the command from the user to store the particular program, content processing server 200 sends the content to transcoder 206. Transcoder 206 transcodes the program into a first configuration (i.e. a first format and a first resolution) and stores the first transcoded copy in storage area 216-1. Content processing server 200 may bypass transcoder 206 and directly store the content into storage area 216-1 if the program is received from content providers 104 in the first format and the first resolution. Similarly, a second user may send a command to store a program that causes content processing server 200 to either transcode the program via transcoder 206 in the first format and the first resolution and store the second transcoded copy in a storage area 216-2 that is associated with the second user.

According to an embodiment of the disclosure, transcoder 206, when storing a particular program for a particular user in storage areas 216, also transcodes that program into multiple configurations (i.e. multiple formats and multiple resolutions) that are different from the first configuration and stores the transcoded copies in shared content storage server 214. For example, if a first user wants to store a program 1 (e.g. episode 1 of Star Trek), then program 1 is transcoded into a first configuration (i.e. in a first format at a first resolution) and the transcoded copy of the program in the first configuration is stored in storage area 216-1. Transcoder 206 then transcodes program 1 into multiple different configurations (i.e. different formats and different resolutions) and stores the transcoded copies in shared storage area 218-1 that is assigned to program 1. When a second user sends a command to store program 1 (i.e. episode 1 of Star Trek in this example), to comply with copyright laws, program 1 is again transcoded into the first configuration (i.e. in a first format at a first resolution) and another transcoded copy of the program in the first configuration is stored in storage area 216-2 that is assigned to the second user. However, the embodiments presented herein do not require that program 1 again be transcoded into multiple configurations since the multiple transcoded copies of program 1 are already present in storage area 218-1 and can be shared between the first and the second users. Since program 1 needs to be transcoded only once into multiple configuration, there are significant savings in the need for additional storage servers, rack space, power, cooling, and maintenance. This decreases both capital expenditure and operating expenditure.

If the first user commands to store a program 2 (e.g. episode 2 of Star Trek), then transcoder 206 also transcodes the second program into the first format at the first resolution and stores the transcoded copy in the first configuration in storage area 216-1. Transcoder 206 then transcodes program 2 into multiple different formats into multiple different configurations and stores the transcoded copies in shared storage area 218-2.

To abide with copyright laws, program 1 stored in storage area 216-1 is accessible only to the first user. Similarly, program 1 stored in storage area 216-2, is only accessible to the second user. However, copies of program 1 in shared content storage server 214 may be shared by both the first user and the second users. A third user who has not requested program 1 to be stored in storage area 216-3 may not have access to the copy of program 1 stored in storage area 216-1 or storage area 216-2, or the multiple transcoded copies of program 1 stored in storage area 218-1. Thus, both the first user and the second user can each access their own respective exclusive copy in storage area 216-1 and 216-2. The first user and the second user can also access the multiple copies of program 1 in shared storage area 218-1.

When the first user requests to view program 1, application processor 204 sends a command to user-specific content storage server 212 to begin streaming the copy of program 1 stored in storage area 216-1 to virtualized transcoder 208. Virtualized transcoder 208, based on one or more criteria received from application processor 204, determines whether the first user can view the program in the first configuration. For example, the criteria may be the type of device being used by first user to view the program and/or the bandwidth available to the first user to view the program. The type of device in use and the bandwidth available to the user may be received by application processor 204 from the device in use by the user and/or hybrid network 108. It is to be appreciated that the criteria may be any criteria that allow the first user to view the program on a particular device without lagging or buffering. For example, a first format and/or resolution at which program 1 is transcoded and stored in storage area 216-1 might not be compatible with a device (e.g. a cellular communications device 106) that is being used by the first user to view a stored copy of program 1. In a further example, the device used by the first user is capable of displaying video in the first format and at the first resolution but there is insufficient bandwidth available over hybrid network 108 to transmit the video in the first format and at the first resolution. If program 1 can be transmitted at the first format and the first resolution to the first user, then virtualized transcoder 208 transmits program 1 in the first format and the first resolution to transmission server 210. Transmission server 210 transmits the program to the first user over hybrid network 108 via signal 217.

When program 1 cannot be viewed in the first format and/or the first resolution, virtualized transcoder 208, based on the criteria, selects a second format and a second resolution from the multiple formats and resolutions in which program 1 is stored in storage area 218-1 at which program 1 can be transmitted to the first user. Virtualized transcoder 208 switches the first transcoded copy of program 1 from storage area 216-1 that is transcoded in the first format at the first resolution for the second transcoded copy of the program in storage area 218-1 that is transcoded in the second format at the second resolution. Virtualized transcoder 208 then transmits the second transcoded copy to transmission sever 210 which in turn transmits it to the first user over hybrid network 108. In an example, user-specific content storage server 216 continues to stream the first transcoded copy to virtualized transcoder 208 in order to keep the first transcoded copy synchronized with the second transcoded copy. Thus if the first user fast-forwards or rewinds the second transcoded copy, the first transcoded copy will also be fast-forwarded or rewinded so that both the first transcoded copy and the second transcoded copies are synchronized. Since the first transcoded copy is continually streamed to virtualized transcoder 208 even though the second transcoded copy is being transmitted to a user, content storage and distribution system 102 appears to transcode the first transcoded copy into the second transcoded copy on-the-fly (even though the second transcoded copy was previously transcoded and stored) thereby "virtually transcoding" the first transcoded copy into the second transcoded copy. Furthermore, if the criteria changes, the second transcoded copy may be switched for a third transcoded copy or back to the first transcoded copy. For example, if bandwidth available to the first user over hybrid network 108 decreases such that the second transcoded copy cannot be transmitted without lag or if the first user switches to another device that requires a transcoded copy with a configuration different then that of the second transcoded copy, then application processor 204 selects a third transcoded copy from storage area 218-1 that meets the changed criteria. Shared content storage server 214 streams the third transcoded copy from storage area 218-1 to virtualized transcoder 208, which switches the second transcoded copy to the third transcoded copy. The first transcoded copy and the third transcoded copy are also synchronized.

It is to be appreciated that virtualized transcoder 208 may be a mux or any other kind of switching device that can receive multiple video streams and based on a signal from application processor 204, switch from one video stream to another video stream for transmission to transmission server 210.

Figure 3:
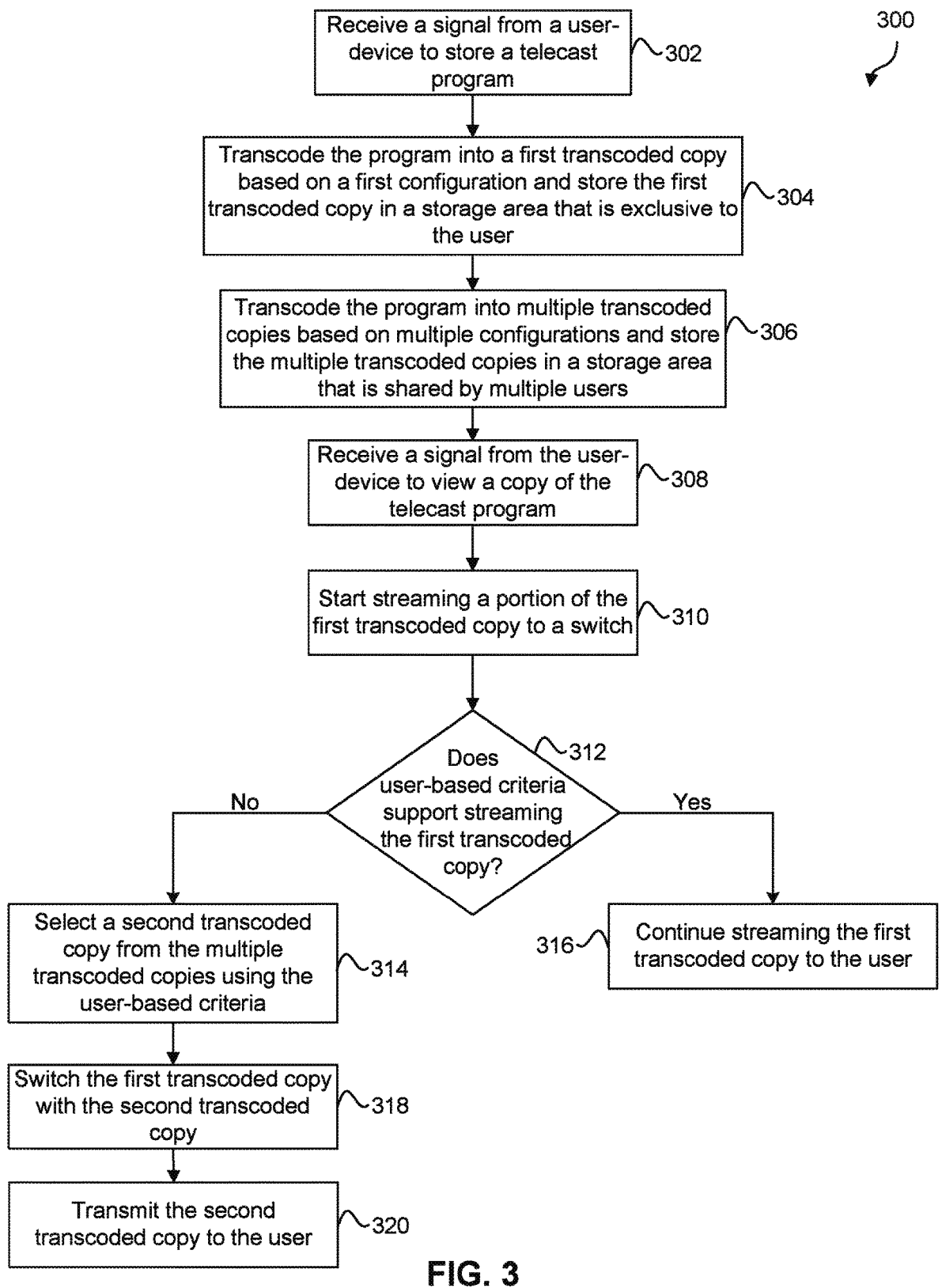
FIG. 3 illustrates and example flowchart illustrating steps to store and distribute content according to an embodiment of the disclosure.

FIG. 3 illustrates and example flowchart 300 illustrating steps to store and distribute content according to an embodiment of the disclosure. Flowchart 300 will be described with reference to the example operating environment depicted in FIGS. 1 and 2. Note that some steps shown in flowchart 300 do not necessarily have to occur in the order shown. In an example, one or more components of content storage and distribution system 102 and/or various other processor circuitry (not shown) may perform the steps in flowchart 300.

In step 302, a signal is received to store a telecast program. For example, a command is received by application processor 204 from the first user to store a program 1 that is telecast by content providers 104 via content storage and distribution server 102.

In step 304, the program is transcoded into a first configuration and stored as a first transcoded copy in storage area that is exclusive to the user. For example, program 1 is transcoded by transcoder 206 into a first transcoded copy in a first configuration and stored in storage area 216-1 that is dedicated to the first user.

In step 306, the program is transcoded into multiple configurations and stored as multiple transcoded copies in a storage area for the program that is shared by multiple users. For example, transcoder 206 may transcode program 1 into multiple transcoded copies and them in storage area 218-1. The multiple transcoded copies of program 1 are shared only by users that also have an exclusive copy of program 1 stored in their respective storage area 216.

In step 308, a signal is received from the user to view a copy of the telecast program. For example, application processor 204 receives a command from a user device to view a copy of program 1.

In step 310, the requested program is streamed from the specific area that is dedicated to the user. For example, application processor 204 sends a signal to user-specific content storage server 212 to stream the copy of program 1 that is stored in storage area 216-1 to virtualized transcoder 208.

In step 312, it is determined, whether user-based criteria supports streaming the first transcoded copy. For example, application processor 204 determines, based on one or more of data received from a device that will be used to view the program that indicates types of formats and resolutions supported or bandwidth available to the device, whether the first transcoded copy can be streamed to the device. If it is determined that streaming the first transcoded copy cannot be supported, then the process proceeds to step 314. If it is determined that the streaming the first transcoded copy is supported, then the process proceeds to step 316. In step 316, the first transcoded copy is streamed to the user. For example, virtualized transcoder 208 streams the first transcoded copy received from user-specific content storage server 212 to transmission server 210. Transmission server 210 streams the first transcoded copy over hybrid network 108 to a user-device.

In step 314, a second transcoded copy from the multiple transcoded copies that are stored is selected based on one or more criteria. For example, application processor selects a second transcoded copy of program 1 from the multiple transcoded copies stored of program 1 stored in storage area 218-1 based on criteria such as the type of user-device and a bandwidth available to the user-device over hybrid network 108.

In step 318, the second transcoded copy is switched for the first transcoded copy. For example, the second transcoded copy is sent by shared content storage server from storage area 218-1 to virtualized transcoder 215, which switches the first transcoded copy received from storage area 216-1 with the second transcoded copy retrieved from storage area 218-1.

In step 320, the second transcoded copy is transmitted. For example, virtualized transcoder 208 transmits the second transcoded copy via transmission server 210 to a user-device.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 4:
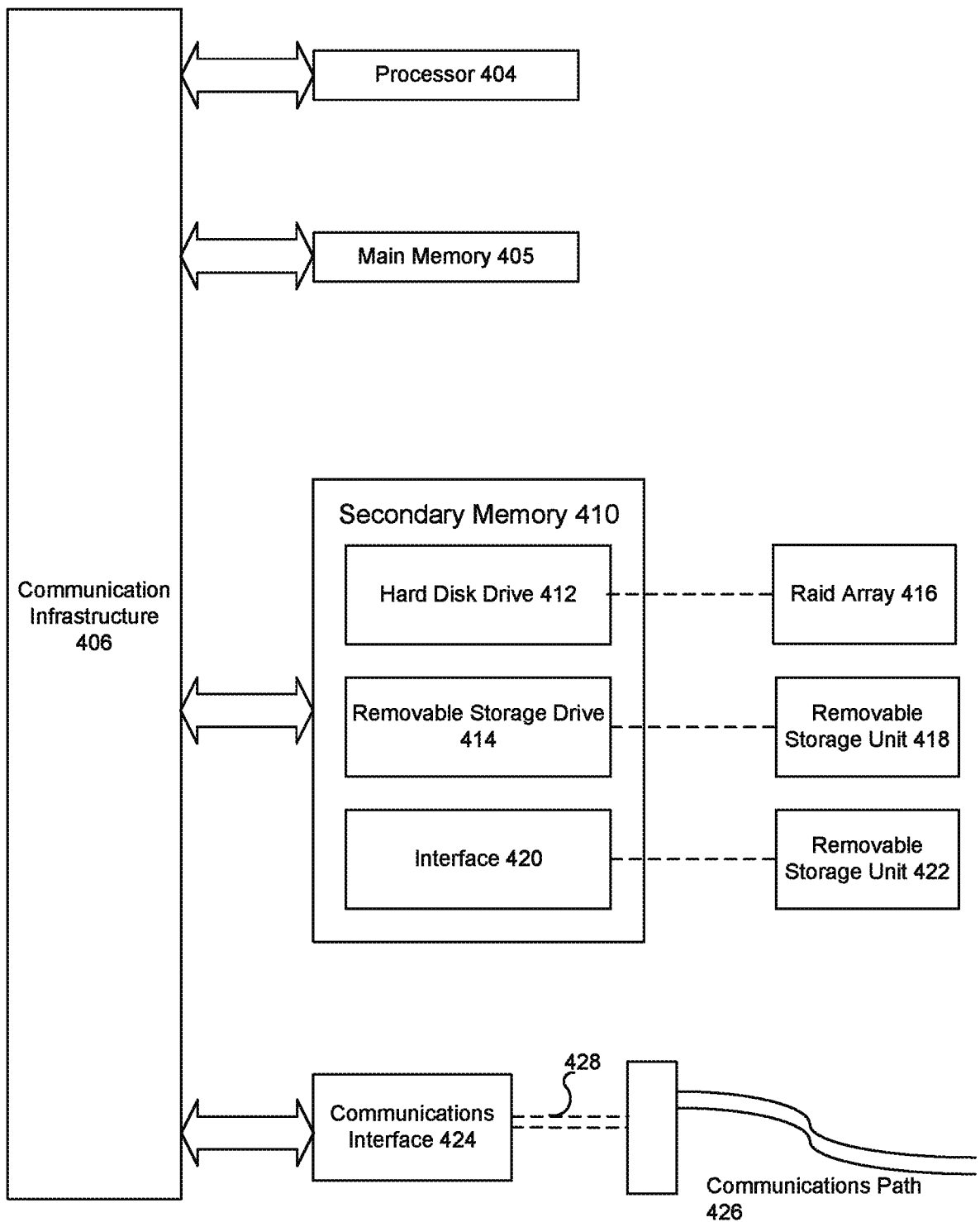
FIG. 4 illustrates an example environment of a computer system on which the disclosure may be implemented.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 400 is shown in FIG. 4. The computer system 400 includes one or more processors, such as processor 404. Processor 404 can be a special purpose or a general-purpose digital signal processor. The processor 404 is connected to a communication infrastructure 406 (for example, a bus or network). Various software implementations are described in terms of this exemplary computer system. After reading this description, it will become apparent to a person skilled in the relevant art how to implement the disclosure using other computer systems and/or computer architectures.

Computer system 400 also includes a main memory 405, preferably random access memory (RAM), and may also include a secondary memory 410. The secondary memory 410 may include, for example, a hard disk drive 412, and/or a RAID array 416, and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418 represents a floppy disk, magnetic tape, optical disk, etc. As will be appreciated, the removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software (i.e. instructions) and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCM-CIA slot and card, etc, that are coupled to a communications path 426. The communications path 426 can be implemented using wire or cable, fiber optics, a phone line, a cellular phone link, an RF link and other communications links or channels.

The terms "computer program medium" and "computer usable medium" are used herein to generally refer to media such as removable storage drive 414, a hard disk installed in hard disk drive 412, or other hardware type memory. These computer program products are means for providing or storing software (e.g. instructions) to computer system 400.

Computer programs (also called computer control logic) are stored in main memory 405 and/or secondary memory 410. Computer programs may also be received via communications interface 424. Such computer programs, when executed, enable the computer system 400 to implement the present disclosure as discussed herein. In particular, the computer programs, when executed, enable the processor 404 to implement the processes and/or functions of the present disclosure. For example, when executed, the computer programs enable processor 404 to implement part of or all of the steps described above with reference to the flowcharts herein. Where the disclosure is implemented using software, the software may be stored in a computer program product and loaded into computer system 400 using raid array 416, removable storage drive 414, hard drive 412 or communications interface 424.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method for recording a program for subsequent playback, the method comprising:
    storing a first exclusive transcoded copy of the program into a first dedicated storage area that is exclusive to only a first user from among a plurality of users in response to a first request from the first user to record the program;
    transcoding the first exclusive transcoded copy of the program from a first configuration to a second configuration to provide a shared transcoded copy of the program;
    storing the shared transcoded copy of the program into a shared storage area that is shared among the plurality of users;
    retrieving a first portion of the first exclusive transcoded copy of the program in the first configuration from the first dedicated storage area that is exclusive to only the first user and a first portion of the shared transcoded copy of the program in the second configuration from the shared storage area that is synchronized with the first portion of the first exclusive transcoded copy of the program in response to a second request from the first user to playback the program; and
    transmitting the first portion of the shared transcoded copy of the program in the second configuration to the first user.

2. The method of claim 1, wherein the retrieving comprises:
    retrieving the first portion of the shared transcoded copy of the program in response to one or more criteria of the first user indicating that the first configuration cannot be supported; and
    wherein the transmitting comprises:
        transmitting the first portion of the shared transcoded copy of the program in the second configuration to the first user in response to the one or more criteria indicating that the first configuration cannot be supported.

3. The method of claim 2, wherein the one or more criteria comprises:
    a type of a user device being used by the first user to view the program; or
    a bandwidth available to the first user.

4. The method of claim 1, wherein the transcoding comprises:
    transcoding the first exclusive transcoded copy of the program from a first resolution and a first video codec to: a second resolution and the first video codec, the first resolution and a second video codec, or the second resolution and the second video codec.

5. The method of claim 4, wherein the first resolution and the second resolution are different resolutions selected from among a group consisting of: 480i, 480p, 576i, 576p, High Definition (HD), 720i, 720p, 1080i, 1080p, and 4k, and
    wherein the first video codec and the second video codec are different video codecs selected from among a group consisting of: x265, h.265, HEVC, 10 bit x264, x264, h.264, AVCHD, AVC, DivX, XviD, MP4, MPEG4, and MPEG2.

6. The method of claim 1, further comprising:
    retrieving a second portion of the first exclusive transcoded copy of the program in the first configuration from the first dedicated storage area that is exclusive to only the first user and a second portion of the shared transcoded copy of the program in the second configuration from the shared storage area that is synchronized with the second portion of the first exclusive transcoded copy of the program in response to the second request from the first user to playback the program;
    transmitting the second portion of the shared transcoded copy of the program in the second configuration; and
    switching from the second portion of the shared transcoded copy of the program to the second portion of the first exclusive copy of the program in response to determining that the first user is able to support the first configuration.

7. The method of claim 1, further comprising:
    storing a second exclusive transcoded copy of the program into a second dedicated storage area that is exclusive to only a second user from among the plurality of users in response to a third request from the second user to record the program.

8. The method of claim 7, further comprising:
    retrieving a first portion of the second exclusive transcoded copy of the program in the first configuration from the second dedicated storage area that is exclusive to only the second user and the first portion of the shared transcoded copy of the program in the second configuration from the shared storage area that is synchronized with the first portion of the second exclusive copy of the program in response to a fourth request from the second user to playback the program; and
    transmitting the first portion of the shared transcoded copy of the program in the second configuration to the second user.

9. A system for recording a program for subsequent playback, the system comprising:
    a memory having a first dedicated storage area that is exclusive to only a first user from a plurality of users and a shared storage area that is shared among the plurality of users; and
    a processor configured to execute instructions, the instructions, when executed by the processor, configuring the processor to:
        store a first exclusive copy of the program into the first dedicated storage area that is exclusive to only the first user in response to a first request from the first user to record the program,
        transcode the first exclusive copy of the program from a first configuration to a second configuration to provide a shared transcoded copy of the program, store the shared transcoded copy of the program into a shared storage area that is shared among the plurality of users, retrieve a first portion of the first exclusive copy of the program in the first configuration from the first dedicated storage area that is exclusive to only the first user and a first portion of the shared transcoded copy of the program in the second configuration from the shared storage area that is synchronized with the first portion of the first exclusive copy of the program in response to a second request from the first user to playback the program, and transmit the first portion of the shared transcoded copy of the program in the second configuration to the first user.

10. The system of claim 9, wherein the instructions, when executed by the processor, further configure the processor to:

retrieve the first portion of the shared transcoded copy of the program in response to one or more criteria of the first user indicating that the first configuration cannot be supported; and transmit the first portion of the shared transcoded copy of the program in the second configuration to the first user in response to the one or more criteria indicating that the first configuration cannot be supported.

11. The system of claim 10, wherein the one or more criteria comprises:

a type of a user device being used by the first user to view the program; or a bandwidth available to the first user.

12. The system of claim 9, wherein the instructions, when executed by the processor, configure the processor to:

transcode the exclusive copy of the program from a first resolution and a first video codec to: a second resolution and the first video codec, the first resolution and a second video codec, or the second resolution and the second video codec to provide the shared transcoded copy of the program.

13. The system of claim 12, wherein the first resolution and the second resolution are different resolutions selected from among a group consisting of: 480i, 480p, 576i, 576p, High Definition (HD), 720i, 720p, 1080i, 1080p, and 4k, and wherein the first video codec and the second video codec are different video codecs selected from among a group consisting of: x265, h.265, HEVC, 10 bit x264, x264, h.264, AVCHD, AVC, DivX, XviD, MP4, MPEG4, and MPEG2.

14. The system of claim 9, wherein the instructions, when executed by the processor, further configure the processor to:

retrieve a second portion of the first exclusive copy of the program in the first configuration from the first dedicated storage area that is exclusive to only the first user and a second portion of the shared transcoded copy of the program in the second configuration from the shared storage area that is synchronized with the second portion of the first exclusive transcoded copy of the program in response to the second request from the first user to playback the program;

transmit the second portion of the shared transcoded copy of the program in the second configuration; and switch from the second portion of the shared transcoded copy of the program to the second portion of the first exclusive copy of the program in response to determining that the first user is able to support the first configuration.

15. The system of claim 9, wherein the instructions, when executed by the processor, further configure the processor to:

store a second exclusive copy of the program into a second dedicated storage area that is exclusive to only a second user from among the plurality of users in response to a third request from the second user to record the program.

16. The system of claim 15, wherein the instructions, when executed by the processor, further configure the processor to:

retrieve a first portion of the second exclusive copy of the program in the first configuration from the second dedicated storage area that is exclusive to only the second user and the first portion of the shared transcoded copy of the program in the second configuration from the shared storage area that is synchronized with the first portion of the second exclusive copy of the program in response to a fourth request from the second user to playback the program; and transmit the first portion of the shared transcoded copy of the program in the second configuration to the second user.

17. A system for recording a program for subsequent playback, the system comprising:

a memory having a first dedicated storage area that is exclusive to only a first user from among a plurality of users, a second dedicated storage area that is exclusive to only a second user from among the plurality of users, and a shared storage area that is shared among the plurality of users; and a processor configured to execute instructions, the instructions, when executed by the processor, configuring the processor to:

receive a first request from the first user to record the program, store a first exclusive copy of the program into the first dedicated storage area that is exclusive to only the first user in response to a first request from the first user to record the program, store a shared transcoded copy of the program that has been transcoded from the first exclusive copy of the program into the shared storage area in response to the first request from the first user to record the program, receive a second request from the second user to playback the program, retrieve a first portion of the second exclusive copy of the program in the first configuration from the second dedicated storage area that is exclusive to only the second user and a first portion of the shared transcoded copy of the program in the second configuration from the shared storage area that is synchronized with the first portion of the second exclusive copy of the program in response to a second request from the second user to playback the program, and transmit the first portion of the shared transcoded copy of the program in the second configuration to the second user.

18. The system of claim 17, wherein the instructions, when executed by the processor, configure the processor to:

retrieve the first portion of the shared transcoded copy of the program in response to one or more criteria of the second user indicating that the first configuration cannot be supported; and transmit the first portion of the shared transcoded copy of the program in the second configuration to the second user in response to the one or more criteria indicating that the first configuration cannot be supported.

19. The system of claim 17, wherein the instructions, when executed by the processor, further configure the processor to:

store the second exclusive copy of the program into the second dedicated storage area that is exclusive to only the second user in response to a third request from the second user to record the program.

20. The system of claim 19, wherein the instructions, when executed by the processor, further configure the processor to:

retrieve a second portion of the second exclusive copy of the program in the first configuration from the second dedicated storage area that is exclusive to only the second user and a second portion of the shared transcoded copy of the program in the second configuration from the shared storage area that is synchronized with the second portion of the second exclusive transcoded copy of the program in response to the second request from the second user to playback the program;

transmit the second portion of the shared transcoded copy of the program in the second configuration; and switch from the second portion of the shared transcoded copy of the program to the second portion of the second exclusive copy of the program in response to determining that the second user is able to support the first configuration.

\* \* \* \* \*